United States Patent [19]

Coughlin et al.

[11] 4,419,476

[45] Dec. 6, 1983

[54] TERNARY ADHESIVE SYSTEMS

[75] Inventors: James E. Coughlin, Philadelphia, Pa.; Eugene G. Sommerfeld, Mt. Laurel, N.J.; Clifford H. Strolle, Springfield, Pa.

[73] Assignee: E. I. Du Pont de Nemours & Co., Wilmington, Del.

[21] Appl. No.: 404,981

[22] Filed: Aug. 9, 1982

Related U.S. Application Data

[63] Continuation-in-part of Ser. No. 310,069, Oct. 9, 1981, abandoned.

[51] Int. Cl.$^3$ ............................................. C08G 18/10
[52] U.S. Cl. .................................... 524/284; 428/480; 428/483; 524/356; 528/60; 528/65; 528/83
[58] Field of Search ............ 428/483, 900, 480; 528/80, 44, 66, 288, 302, 60, 65, 83; 252/62.54, 182; 524/284, 356

[56] References Cited

U.S. PATENT DOCUMENTS

| | | | |
|---|---|---|---|
| 3,584,075 | 6/1971 | Bock et al. | 528/80 |
| 3,666,835 | 5/1972 | Schloss | 528/66 |
| 3,763,079 | 10/1973 | Fryd | 428/900 X |
| 3,804,810 | 4/1974 | Fryd | 528/80 X |
| 4,206,299 | 6/1980 | Yamazaki et al. | 528/288 |
| 4,298,724 | 11/1981 | Sommerfeld et al. | 528/302 |

*Primary Examiner*—Maurice J. Welsh
*Attorney, Agent, or Firm*—James H. Ryan

[57] ABSTRACT

Disclosed are adhesive systems and adhesives formed from (A) hydroxyl-terminated, preferably branched, polyols, (B) isocyanate-capped, polyol-based urethanes and (C) polyisocyanate crosslinking agents. In their preferred embodiments, they are applicable by direct gravure procedures and are useful in boil-in-bag technology.

39 Claims, No Drawings

TERNARY ADHESIVE SYSTEMS

RELATED APPLICATION

This application is a continuation-in-part of our copending application Ser. No. 310,069, filed Oct. 9, 1981, and now abandoned.

BACKGROUND OF THE INVENTION

1. Field of the Invention

This invention relates to ternary adhesives and systems formed from a branched polyester and two isocyanates, an isocyanate-capped polyester-urethane and a polyisocyanate. All of these are very soluble in organic solvents and can comply with pollution-abatement regulations. The adhesives contain aromatic groups and are particularly useful in bonding poly(ethylene terephthalate) to other flexible plastic substrates.

2. Prior Art

Bock et al. U.S. Pat. No. 3,584,075 shows a polyurethane adhesive based on an aliphatic polyester, an aromatic polyester, and a diisocyanate.

Schloss U.S. Pat. No. 3,666,835 shows textile laminating adhesives based on a hydroxyl-terminated urethane prepolymer and an isocyanate-terminated urethane prepolymer.

Fryd U.S. Pat. Nos. 3,763,079 and 3,804,810 show hydroxyl-terminated polyurethanes formed from copolyesters.

Yamazaki et al. U.S. Pat. No. 4,206,299 shows an adhesive for plastics and metal foil containing a silane coupling agent and acknowledges certain other prior art.

Sommerfeld et al. U.S. Pat. No. 4,298,724 (Sommerfeld) shows branched polyesters some of which are useful in this invention and procedures for making them applicable to all.

The above-identified art is incorporated herein by reference.

SUMMARY OF THE INVENTION

The present invention comprises novel laminating adhesive compositions formed at the time of use by the interaction of three precursors, namely:

A. a hydroxyl-terminated branched polymer of low molecular weight, preferably a branched polyester;

B. an isocyanate-terminated substantially linear urethane of low molecular weight, preferably a polyester-urethane; and C. a polyisocyanate crosslinking agent.

The compounds of B are themselves novel non-volatile isocyanates. Therefore, they form one aspect of the invention. Furthermore, since B and C are both isocyanates, they can be premixed and packaged together if it is so desired. The isocyanate mixture or blend constitutes an aspect of the invention. The laminate products are another aspect of the invention.

When all three of the listed components are mixed, they form a high solids adhesive with little polluting solvent and many remain stable at room temperature (ca. 25° C.) long enough (for up to 8 hours) to be used, for example, in direct gravure application on a conventional coater/laminator with sufficient green strength (adhesion before final curing) for post handling. The preferred cured adhesive is both sufficiently adherent and sufficiently heat resistant to serve as a boil-in-bag adhesive.

Details of the invention follow.

THE HYDROXYL-TERMINATED BRANCHED POLYESTER

A. The first of the three precursors of the present adhesives, polymer A, is a polymeric polyol, preferably a branched hydroxyl-terminated polyester. The polyester is prepared in a single step by conventional methods for preparing polyesters from conventional materials, e.g., (1) a diol, (2) generally a higher polyol (i.e., one containing more than two hydroxyl groups per molecule), (3) a dibasic aromatic acid, and (4) a dibasic aliphatic acid.

Diols (1) usable here are any of those commonly employed. They can be aliphatic or aromatic and generally have 2–14 carbons. They can be substituted with or interrupted with noninterferring groups such as O, S, halogen and the like. Suitable diols include: ethylene glycol, propylene-1,2-glycol, propylene-1,3-glycol, butylene-1,3-diol, butylene-1,4-diol, butylene-2,3-diol, neopentylglycol, i.e., 2,2-dimethylpropane-1,3-diol, 2,2-diethylpropane-1,3-diol, 2-methyl-2-propylpropane-1,3-diol, decamethylene glycol, dodecamethylene glycol, thioethylene glycol, monoethyl ether of glycerine, α- and β-allyl ethers of glycerol, and the like. Polycaprolactone diol, the reaction product of caprolactone and ethylene glycol, can also be used.

Preferably the diols will have about 2–8 carbon atoms; most preferably they will have about 2–6 carbon atoms. Ethylene glycol is particularly preferred.

Higher polyols (2) used as branching agents, preferably have 3–14 carbons and a functionality greater than 2. They include triols, tetraols, etc., such as glycerine, trimethylolpropane, pentaerithrytol, 1,2,6-hexanetriol, and the like.

Aromatic (3) and aliphatic (4) acids can be unsubstituted or can contain, be substituted with or be interrupted by noninterferring groups such as O, S, halogen, keto and the like. Suitable dicarboxylic acids include: malonic, succinic, glutaric, adipic, pimelic, suberic, azelaic, sebacic, brassylic, maleic, fumaric, dilinoleic, diphenic, phthalic, tetrachlorophthalic, isophthalic, terephthalic, orthophthalic, cyclohexane dicarboxylic, p-phenylene diacetic, naphthalene dicarboxylic, dihydromuconic, β-methyl adipic, trimethyl adipic, ethylether-2,2'-dicarboxylic, and the like. Anhydrides of these dicarboxylic acids can be used where they exist. Lower alkyl esters of these acids can also be used in a transesterification process.

Preferably, the dicarboxylic acids, anhydrides or esters of dicarboxylic acids will have about 4–12 carbon atoms, and include terephthalic acid, isophthalic acid, orthophthalic acid, azelaic acid, adipic acid, and a mixture of $C_4$–$C_6$ aliphatic dicarboxylic acids.

The usable polyesters are generally prepared from the ingredients of the products of the above-mentioned Sommerfeld application and in substantially the same manner. They are not, however, coextensive with those products since some of the unsatisfactory oils of that application can be employed here. This fact is evident from the ratios of materials used.

The first of these ratios is $X_{1A}$, where $$X_{1A} = \frac{\text{Total Moles of Polyol}}{\text{Total Moles of Diacid}}.$$

In a broad range, $X_{1A}$ extends between 1.05 and 1.5. More narrowly, in a preferred range, it is between 1.2 and 1.3. $X_{1A}$ defines the molecular weight ($\overline{M}_n$) of the prepolymer, i.e., $\overline{M}_n = 1,000-5,000$. (In all the ratios used, the denominator is assumed as 1 unless given.)

A second ratio is $X_{2A}$, where $$X_{2A} = \frac{\text{Total Moles of Diol}}{\text{Total Moles of Higher Polyol}}.$$

Broadly, $X_{2A}$ is between $\infty$ and 0.86, preferably between $\infty$ and 2.25, i.e., higher polyol can be omitted. More preferably, however, it is between 12 and 3.3. $X_{2A}$ defines the branching of the polyester.

A third ratio is:

$$X_{3A} = \frac{\text{Moles of Aromatic Acid}}{\text{Moles of Total Acid}}.$$

The presence of some aromatic material is important in this invention, e.g., to increase adhesion, heat resistance, etc., of the product. It can be supplied from two sources, from the polyester A and the polyester-urethane B. Consequently, $X_{3A}$ lies in the range O-ca. 0.8, 0, of course, indicating that aromaticity is supplied by component B. Preferably, however, the lower limit for $X_{3A}$ should be about 0.3 and a preferred range is 0.3–0.65.

As indicated in the Sommerfeld patent, the polyesters A can be prepared very simply. The ingredients may be mixed in proportions indicated by the ratios $X_{1A}$, $X_{2A}$, and $X_{3A}$ and heated in the range of about 160°–260° C. with removal of water as the reaction proceeds. The product has an acid number of less than 5 or, often, less than 1. Alternatively, transesterification can be employed using lower alkyl esters such as methyl esters rather than acids. In this alternate process, a transesterification catalyst such as an organometallic compound of tin, etc., is needed and an alcohol rather than water is removed. $\overline{M}_n$ by either route is about 1,000–5,000.

THE ISOCYANATE-TERMINATED URETHANE

The polyester-urethane B is an isocyanate-terminated polymer of low-molecular weight formed by chain extending and endcapping at least one substantially linear hydroxyl-terminated polyester, here regarded as a prepolymer, by reaction with at least one diisocyanate. The reaction including ingredients and conditions but usually without catalyst is otherwise substantially as shown by the Fryd patents (see especially columns 1–4 of U.S. Pat. No. 3,763,079) and proceeds by steps. The polyester prepolymer is first formed by direct action between diol and diacid. It is then reacted with a diisocyanate possibly in the vessel in which it was prepared. Copolyesters are not essential, however, only preferred, and two different dicarboxylic acids are not essential.

Ratios can be set up for B as for A, above. Thus, for the prepolymer and hence for B itself, $$X_{1B} = \frac{\text{Total Moles of Polyol}}{\text{Total Moles of Diacid}}$$

is within the range 1.05–1.5 ($\overline{M}_n = 500-4,000$).

$$X_{2B} = \frac{\text{Total Moles of Diol}}{\text{Total Moles of Higher Polyol}},$$

is within the range 5–$\infty$, since some branching is satisfactory. Preferably, $X_{2B}$ is at least 10. And $$X_{3B} = \frac{\text{Moles of Aromatic Acid}}{\text{Total Moles of Acid}} = 0-0.8.$$

Since isocyanate-terminated or end-capped products are desired here, the ratio of isocyanate to hydroxyl is appreciably larger than in Fryd who teaches non-NCO-containing polyester-urethanes. This additional equivalent ratio, $$X_{4B} = -\text{NCO}/-\text{OH},$$

is broadly in the range 2–1.2 with the range 1.7–1.3 being preferred.

The (co)polyesters are produced by conventional techniques which are well known. Ordinarily, the reactants will be admixed in a suitable reaction vessel, with heating to a temperature of about 150° C.–250° C. for 5–15 hours to produce the polyester. Diols, dicarboxylic acids and higher polyols, where employed, can be those given above for the preparation of polyester A. A preferred polyol branching agent is trimethylol propane.

The polyester-urethanes of the invention are obtained by reacting directly the substantially linear hydroxyl-terminated polyester prepolymers with diisocyanates, generally in an organic solvent. Any of the common organic solvents are usable so long as they are dry and lack hydroxyl or other groups reactive with isocyanate. Ketones such as acetone, methyl ethyl ketone and the like are particularly useful. In this reaction, the equivalent ratio of isocyanate from the diisocyanate to hydroxyl from the prepolymer are greater than 1/1 as is evident from the values of $X_{4B}$, above.

The diisocyanates for use with the polyesters in this invention can be aliphatic or aromatic. Suitable isocyanates include: hexane-1,6-diisocyanate, decane-1,10-diisocyanate, diisocyanates derived from dimerized fatty acids, phenylene-1,4-diisocyanate, toluene-2,4-diisocyanate, toluene 2,6-diisocyanate, naphthylene-1,5-diisocyanate, diphenylmethane-4,4'-diisocyanate, diphenylmethane-3,3'-dimethoxy-4,4'-diisocyanate, dicyclohexylmethane-4,4'-diisocyanate, etc.

Preferred are toluene-2,4-diisocyanate, toluene-2,6-diisocyanate and mixtures thereof.

The products B of the polyester-isocyanate reaction are very soluble but nonvolatile isocyanates and have the general utilities of isocyanates, e.g., as reactants with hydroxyl-carrying compounds to prepare polyurethane coating materials, or the like. In some cases, they can serve as crosslinkers (see Example 15, below), but here the use of a polyisocyanate C is preferred.

THE POLYISOCYANATE

The precursors A and B are reacted in situ in the laminate of the invention to form what is basically a block copolymer. This procedure permits low molecular weight and low viscosity of the components in the adhesive of the mix directly after combining the components but develops a high molecular weight product by extension in situ upon the workpiece, i.e., a substrate such as film, metal, etc., upon curing. Sufficient crosslinking between the hydroxyl Groups of A and the isocyanate groups of B is not generally attainable without the presence of a more highly functional crosslinking agent. To achieve the desired results, polyester A is used in excess over polyester-urethane B, and some of the isocyanate deficiency is supplied by at least one polyisocyanate crosslinking agent C having an average functionality greater than 2.

Usable polyisocyantes include aliphatic or aromatic compounds such as 4,4',4''-triisocyanatotriphenyl methane, 1,3,5-triisocyanatobenzene, 2,4,6-triisocyanatotoluene, and the like, biurets of the diisocyanates mentioned above such as the trimerization product of hexane-1,6-diisocyanate, adducts of one or more diisocyanates with one or more higher polyols such as propane triol, 1,2,6-hexane triol, trimethylolpropane, pentaerythritol, etc. Preferred polyisocyanates are the adducts of aromatic diisocyanates with trimethylolpropane in a 3/2 or 5/2 mole ratio to yield a polyisocyanate having a functionality of 3 or 4, such as the adduct of toluene-2,4-diisocyanate or toluene-2,6-diisocyanate, or mixtures thereof, with trimethylolpropane in a 5/2 mole ratio.

The proportions of B and C in the mixture employed can vary within limits but at least 50% (by weight) of B is preferred. A broad range of B is 94–50% with a preferred range of 90–70%. Conversely, the ranges of C are 6–50 and 10–30%, respectively. The higher ranges of C, e.g., above about 30%, result in embrittlement but can be used where brittle adhesives are desired. All of these compounds are very soluble in nonreactive organic solvents, e.g., ketones such as methyl ethyl ketone (MEK), esters such as ethyl acetate (EA), etc. Consequently, solutions of 50–70% by weight at room temperature can readily be obtained, with above 60%, i.e., 62–75%, being generally made. These solutions or blends have the normal utilities of polyfunctional isocyanates.

The ratio of polyester A to the combined isocyanates is also of importance. A should form 25–75% by weight of the final adhesive mixture and combined B and C should form the remaining 75–25%, all based on the solids present. For higher solids use, A should form 40–65% of the final adhesives. The total aromaticity derived from the aromatic acids in A plus B should be no less than 15% on a mole basis of the total acids present.

The two isocyanates used in the adhesive, polyesterurethane B and polyisocyanate C, may conveniently be mixed before the reaction with polymer A. They may, in fact, be packaged together and used as one package of a two-package adhesive system. Solvents are generally used to lower the viscosity sufficiently to permit utilization while maintaining EPA compliance in the final blend. Any organic solvent inert to organic isocyanates can be employed, the amount being varied in accord with the application requirements. Representative solvents include methyl ethyl ketone, methyl isobutyl ketone, acetone, dimethyl sulfoxide, isophorone, mono(lower-alkyl)ethers of ethylene glycol acetate, mone(lower-alkyl)ethers of diethylene glycol acetate, lower alkyl acetates, etc.

A catalyst to speed up reaction between polyester A of the first package and isocyanates B and C of the second package may be added to either package, if desired. The catalyst, useful particularly at lower temperatures, can consist of organometallics such as dibutyltin dilaurate, etc., organic bases such as amines, and the like. Up to about 100 ppm based on total package solids is effective. Catalyst can also be added separately to the adhesive when it is mixed, if desired.

THE ADHESIVE

Polyester A and the two isocyanates B and C (separately or packaged) are mixed together at the time of use. Because of their solubility and low viscosity in organic solvents, they product high solids adhesives, i.e., adhesives containing 50–90% by weight of solids or here preferably 60–75% or most preferably 65–70%, and are useful in minimizing pollution. They can be employed with a wide variety of substrates, e.g., paper, plastic film, glass, wood, and the like.

The mixed adhesives can be applied to substrates in any convenient manner. If, however, their viscosity is less than 1000 centipoise at room temperature (about 20° C.), they can be applied by direct gravure procedures. The present adhesives in general have such a viscosity, i.e., less than 1000 cps, and can retain it for up to 8 hours. Thus, they can be used with conventional direct gravure machinery, e.g., the Faustel Model TT coater/laminator made by Faustel, Inc., Butler, Wis., currently employed with conventional, i.e., not high solids, adhesives. Expensive conversion to offset gravure machinery is thus avoided. As far as is known, these novel ternary adhesives are the first high solids adhesives applicable by direct gravure to give the balance of properties heretofore mentioned.

In their preferred embodiment, the final products of the invention possess sufficient green strength and sufficient resistance to heat, moisture, oils and acid to be used as boil-in-bag adhesives. Their aromatic content makes them especially valuable in bonding flexible films, e.g., polyethylene, metal foil, etc., to poly(ethylene terephthalate).

In usual boil-in-bag technology, poly(ethylene terephthalate) and polyethylene films are bonded together by means of adhesive (preferably by direct gravure), the resultant laminated film is folded, and the (inner) polyethylene film is itself sealed by heat around two edges to form the inside of a pouch. Food is placed in the pouch and the polyethylene film is heat sealed to itself along the third edge (the fourth "edge" is the fold). The sealed pouch is placed in boiling water for one hour. If no delamination occurs within this period, the sealed bag is considered acceptable.

EXAMPLES

There follow some examples illustrating the invention. A, B and C represent respectively and as above the hydroxyl-terminated branched polyester, the isocyanate-terminated polyester-urethane and the polyisocyanate crosslinking agent. The last mentioned was, in all cases, Mondur ® CB-75, the 5/2 molar product of toluene diisocyanate (TDI) and trimethylol propane supplied at 75% solids in ethyl acetate (EA) by Mobay Chemical Company. Temperatures are in degrees centigrade and percentages and proportions in terms of weight unless otherwise noted.

Example 1 represents the preferred embodiment of the invention. It also shows the procedure used in all examples but no order of preparation of the examples is intended by the order of listing.

EXAMPLE 1

(a) A 12-1,3-necked resin flask fitted with a fractionating column mounted with a water-separator or variable take-off head, an agitator and a thermometer was charged with:

| Ingredient | Weight (g) |
| --- | --- |
| Trimethylol propane (TMP) | 970.48 |
| Ethylene glycol (EG) | 2244.33 |
| Terephthalic acid (T) | 901.06 |
| Isophthalic acid (I) | 1502.00 |
| Azelaic acid (9) | 4087.69 |
| | 9701.56 |

The reaction mixture was heated to 260° as 1301.69 g of water was collected over a 12-hr. period. The vapor temperature was held below 105° C. At Acid No=0.94, the charge was cooled and thinned with methyl ethyl ketone (MEK) to 85% solids. The product was a solution of the polyester TMP/EG//T/I/9 of the mole ratio 0.2/1.0//0.15/0.25/0.60: Gardner Holdt visc=X (1290 cps); Hydroxyl No=144 (Theo=145); Residual EG=0.43%; Res TMP=0.01%; % H$_2$O=0.043%; GPC $\overline{M}_n$=2900, $\overline{M}_w$=9100, $\overline{M}_z$=23,000; D=3.2; sp g dist=1.002.

(b) 1. A polyester prepolymer was prepared in a flask as above charged with:

| Ingredient | Weight (g) |
| --- | --- |
| EG | 3,636.65 |
| T | 2,471.16 |
| I | 1,272.76 |
| 9 | 4,241.76 |
| | 11,622.50 |

The reaction mixture was heated to 260° as 1,623 g of water was collected over a period of 13 hrs. The mixture was cooled at a final Acid No of 4.5 to give a prepolymer of the mole ratio EG//T/I/9 1.3//0.33/0.17/0.50; Hydroxyl No=144 (Theo=152); Resid EG=0.77%; visc=800 p; H$_2$O=0.75%; GPC $\overline{M}_n$=1500, $\overline{M}_w$=2400, $\overline{M}_z$=3600; D=1.6 g; sp g dist=1.002.

2. Polyester prepolymer from 1, above, was end-capped and chain-extended with toluene diisocyanate (TDI) in the equivalent ratio $X_{4B}$=1.67 (based on Hydroxyl No 130). A 3-necked flask fitted with a reflux condensor, and agitator was charged with 1500 g of the polyester prepolymer and 668.3 g of ethyl acetate. The mixture was agitated, purged and blanketed with N$_2$ and heated to 60° at which time 505 g of TDI was added as rapidly as possible. The reaction exotherms to 70°–75° and heat was applied to bring the reaction mass to reflux at 86°–88°. The reaction was held for 6 hrs. at reflux and cooled to room temperature to give a solution: Gardner-Holdt visc=Z 2¼ (3340 cps) at 75% solids (G-H visc=H (200 cps) at 60% solids); —NCO=3.68% (on solids); Resid TDI=0.30%; GPC $\overline{M}_n$=3900, $\overline{M}_w$=7800, $\overline{M}_z$=1400.

(c) Polyester A and the isocyanate-terminated polyester-urethane B, both above, and polyisocyanate C (Mondur ® CB-75) were blended together in MEK for one-half hour at the time of use to contain:

| Component | Weight of Charge (g) |
| --- | --- |
| A (85% solids in MEK) | 67.3 |
| B (75% solids in EA) | 44.9 |
| C (75% solids in EA) | 12.1 |
| MEK | 29.5 |
| | 153.8 |

The weight ratio A/B/C=57.24/33.67/9.09 (dry); B/C=78.74/21.26 (dry); Solids=65%; visc=15–25 sec Zahn No. 3 (120–300 cps).

The mixture thus prepared was coated within 8 hours onto 48 LB Mylar ® (trademark of E. I. du Pont de Nemours and Company) poly(ethylene terephthalate) film and laminated in rolls by direct gravure to medium density polyethylene (MDPE) film by means of a Faustel Model TT coater/laminator (Faustel, Inc., Butler, Wis.). The following conditions were maintained throughout the test:

Cylinder: 200 TH (trihelical)
Oven Temp: 93°
Speed: 30 ft/min (9.1 m/min)
Coater Nip: 80 psi (5.6 Kg/cm$^2$).

Coating weights were determined to be 1.1 to 1.6 lbs/300 ft$^2$ (1.7–2.6 g/m$^2$). Peel strengths (90° and 180°, angular) were determined using an Instron "C" cell at 25° with a crosshead speed of 12 in/min (30 cm/min). Green strength values (taken within 2 hours) were in the range 100–300 g. After three days, bond strengths were in the range 600–1300 g. Generally, one of the substrate films then tore before the bond. Similar results were obtained after 8 weeks.

(d) Pouches (6"×6"; 15 cm×15 cm) were prepared from the Mylar ®/MDPE laminate from (c) by folding and sealing on a Sentinel Heat Sealer (375° F.; 40 psi; 1.0 sec: 190° C.; 2.8 Kg/cm$^2$; 1.0 sec) along three edges of the polyethylene inner layer to form bags open at one edge. Two separate bags were filled ⅔ full of water and a commercial tomato sauce respectively. The thus-filled bags were heat sealed on the open edge after air was manually squeezed from them. The bags were then held for an hour in boiling water. The bags were regarded as satisfactoy, i.e., no delamination occurred, after the treatment described.

EXAMPLES 2 AND 3

Example 1 was substantially repeated except that the hydroxyl-terminated branched polyester A was different and the ratios of A, B and C were varied. The isocyanate-terminated polyester-urethane was as prepared in Example 1(b) and the polyisocyanate was Mondur ® CB-75. The same ingredients were used in the polyester A of Examples 2 and 3 as in Example 1 but the TMP/EG//T/I/9 mole ratio was 0.3/1.0//0.2/0.3/0.5.

The adhesive was blended as follows:

| Component | Example 2 (g) | Example 3 (g) |
| --- | --- | --- |
| A (85% solids in MEK) | 962.8 | 665.0 |
| B (75% solids in EA) | 641.9 | 665.0 |
| C (75% solids in EA) | 173.3 | 142.0 |
| MEK | 422.0 | 328.0 |

For Example 2, the dry Weight Ratio A/B/C was 57.24/33.67/9.09 and the B/C Ratio was 78.74/21.26. Product (65% solids in solvent) showed: visc=23 sec (220 cps). For Example 3, the dry Weight Ratio A/B/C was 48.29/42.61/9.1 and the B/C Ratio was 82.4/17.60.

Both of these products were excellent adhesives with good boil-in-bag properties when applied by direct gravure as in Example 1.

EXAMPLE 4

Example 1 was substantially repeated with the variation of slight branching in the polyester prepolymer from which Component B, the polyester-urethane, was prepared. The Components A and C were the same as in Example 1.

For the polyester prepolymer, a 5-1,3-necked flask fitted with a fractionating colum mounted with a water separator or variable take-off head, agitator, and thermometer was charged with:

| Ingredient | Weight (g) |
|---|---|
| TMP | 92.8 |
| EG | 515.2 |
| T | 172.4 |
| I | 287.4 |
| 9 | 781.3 |

This charge corresponds to the mole ratio TMP/EG//T/I/9 of 0.1/1.2//0.15/0.25/0.6 and a "branching" ratio $X_{2B}$ of 12. The charge was heated to 260° as 249 g of water was collected over a 7-hour period, the vapor temperature being held below 105°. At Acid No=0.02, distillation was stopped and the batch cooled in preparation for the extension reaction. For the prepolymer: GPC $\overline{M}_n=1800$, $\overline{M}_w=3600$, and $\overline{M}_z=6400$; Hydroxyl No=149 (Theo=170); H₂O=0.37%; sp g dist=1.002.

The branched prepolymer was chain-extended and end-capped with TDI in the —NCO/—OH Equivalent Ratio $X_{4B}=1.7/1$ (based on Hydroxyl No=165). Prepolymer (1500 g) and 717 g of EA were charged into a 3-necked flask equipped as in Ex. 1(b)(2). The mixture was agitated, purged and blanketed with N₂ and heated to 50°. TDI (295 g) was added at 50° as rapidly as possible resulting in an exotherm to 60°-65°. Heat was applied to bring the reaction mass to reflux (88°) and the reaction was held for 6 hours at reflux. When cooled, the product solution showed: Gardner-Holdt visc=Z-2 (3260 cps) at 75% solids (G-H visc=J (250 cp) at 60% solids); —NCO=5.24% (on solids); Resid TDI=0.64% (on total); GPC $\overline{M}_n=4000$, $\overline{M}_w=15,000$, $\overline{M}_z=41,000$.

An adhesive was made up as follows:

| Ingredient | Weight (g) |
|---|---|
| A (from Ex. 1; 85% solids in MEK) | 758.6 |
| B (branched as above; 75% solids in EA) | 505.7 |
| C (Mondur ® CB-75; 75% solids in EA) | 210.4 |
| MEK | 325.3 | the weight ratio A/B/C=54.56/32.09/13.35 (dry); B/C=70.62/29.38 (dry); Solids=65% (total solids); visc=22 sec Zahn No. 3 (ca 200 cps).

When the adhesive system thus blended was applied to polyethylene/poly(ethylene terephthalate) film by direct gravure as in Example 1, the laminate showed excellent green strength and, upon curing, excellent boil-in-bag properties.

EXAMPLES 5 TO 14

The following Examples in Table I represent a number of polyester compositional variables. Various weight ratios of Components A/B/C and Components B/C are demonstrated. In all cases, A/B/C and B/C are on a dry weight basis. All Examples were evaluated at 65 wt. % solids.

TABLE I

| Ex. | Component A Composition[1] | Mole Ratio | $X_{1A}$ | $X_{2A}$ | $X_{3A}$ |
|---|---|---|---|---|---|
| 5 | EG//T/I/9 | 1.06//.33/.17/.50 | 1.06 | ∞ | 0.5 |
| 6 | TMP/EG//T/I/9 | .2/1.1//.2/.3/.50 | 1.30 | 5.5 | 0.5 |
| 7 | TMP/EG//T/I/9 | .1/1.2//.15/.25/.60 | 1.30 | 12.0 | 0.4 |
| 8 | TMP/EG//T/I/9 | .2/1.1//.15/.25/.60 | 1.30 | 5.5 | 0.4 |
| 9 | EG/NPG//T/I/9/6[8] | 1.0/0.3//.15/.25/.3/.3 | 1.30 | ∞ | 0.4 |
| 10 | TMP/EG//T/I/9 | .3/1.0//.2/.3/.5 | 1.30 | 3.33 | 0.5 |
| 11 | TMP/EG//T/I/9 | .3/1.0//.2/.3/.5 | 1.30 | 3.33 | 0.5 |
| 12 | TMP/NPG/EG//T/I/9/6 | .2/.3/.7//.15/.25/.3/.3 | 1.20 | 5.0 | 0.4 |
| 13 | TMP/NPG/EG//T/I/9 | .2/.3/.7//.15/.25/.60 | 1.20 | 5.0 | 0.4 |
| 14 | TMP/NPG//T/I/9 | .2/1.0//.15/.25/.60 | 1.20 | 5.0 | 0.4 |
| 15 | TMP/EG//T/I/9 | .2/1.1//.2/.3/.50 | 1.30 | 5.5 | 0.5 |

| Ex. | A/ | B/ | C[7] | B/ | C[7] | VISC (CPS) | Remarks[2] BIB[3] | Green Str.[4] | Retained Bond Str.[5] | Direct Gravure[6] |
|---|---|---|---|---|---|---|---|---|---|---|
| 5 | 49.0 | 43.30 | 7.70 | 84.90 | 15.10 | 1300 | Yes | Yes | Yes | No |
| 6 | 28.05 | 62.86 | 9.09 | 87.40 | 12.60 | 1000 | Yes | Yes | Yes | No |
| 7 | 48.29 | 42.61 | 9.10 | 82.40 | 17.60 | 175 | Yes | Yes | Yes | Yes |
| 8 | 48.29 | 42.61 | 9.10 | 82.40 | 17.60 | 160 | Yes | Yes | Yes | Yes |
| 9 | 48.29 | 42.61 | 9.10 | 82.40 | 17.60 | 190 | No | Yes | Yes | Yes |
| 10 | 59.95 | 35.27 | 4.78 | 88.06 | 11.94 | 220 | No | Yes | Yes | Yes |
| 11 | 52.46 | 30.85 | 16.69 | 64.89 | 35.11 | 230 | Yes | Yes | No | Yes |
| 12 | 54.20 | 36.10 | 9.70 | 78.82 | 21.18 | 300 | No | Yes | Yes | Yes |
| 13 | 54.20 | 36.10 | 9.70 | 78.82 | 21.18 | 300 | No | Yes | Yes | Yes |
| 14 | 54.20 | 36.10 | 9.70 | 78.82 | 21.18 | 300 | No | Yes | Yes | Yes |

TABLE I-continued

| 15 | 30.85 | 69.15 | 0.0 | 100.0 | 0.0 | 1000 | No | Yes | Yes | No |

[1] Composition B: in all Examples except Ex. 5, Polyester B = EG//T/1/9, 1.3//0.33/0.17/0.50; for Ex. 5, EG//T/1/9, 1.06//0.33/0.17/0.50. $X_{2B} = \infty$ in all cases, $X_{3B} = 0.5$ in all cases, $X_{4B} = $ —NCO/—OH equivalent ratio = 1.67 in all cases.
[2] All show adhesive utility in various end uses.
[3] BIB = Boil-in-bag test.
[4] Green Str. = Initial adhesive strength up to 2 hrs. after application.
[5] Retained Bond Str. = Aged adhesive strength up to 2 mos.
[6] Direct Gravure = May be applied @ 65-70 wt. % solids. Those Exs. labeled "No" are applicable by other methods, e.g., offset gravure.
[7] Composition C = Mondur ® CB-75 in all cases.
[8] NPG = Neopentyl glycol; 6 = Adipic acid.

We claim:

1. A ternary adhesive system consisting essentially of:
   A. at least one hydroxyl-terminated polymeric polyol having a molecular weight $\overline{M}_n$ of about 1,000-5,000 and soluble in methyl ethyl ketone or ethyl acetate to the extent of at least 65% by weight;
   B. an isocyanate-capped polyol-urethane formed from at least one polyol having a molecular weight $\overline{M}_n$ of about 500-4,000 which has been extended and capped with a diisocyanate in the —NCO/—OH ratio of 2/1-1.3/1 and is capable of forming a block copolymer with and thereby extending polyol A; and
   C. a polyisocyanate crosslinking agent C supplying 6-50% by weight in a mixture of B plus C.

2. An adhesive system of claim 1 wherein A forms 25-75% by weight of the solids present therein.

3. An adhesive system of claim 1 wherein the polyol of A and the polyol of B are polyesters.

4. An adhesive system of claim 3 comprising about 50-90% by weight of solids.

5. An adhesive system of claim 3 comprising about 60-75% by weight of solids.

6. An adhesive system of claim 3 wherein the hydroxyl-terminated polyester A is a copolymer of at least one aromatic dicarboxylic acid and at least one aliphatic dicarboxylic acid with at least one polyol, $$\text{the ratio } X_{1A} = \frac{\text{Total Moles of Polyol}}{\text{Total Moles of Diacid}}$$

extending between 1.05/1 and 1.5/1, $$\text{the ratio } X_{2A} = \frac{\text{Total Moles of Diol}}{\text{Total Moles of Higher Polyol}}$$

extending between $\infty$ and 0.86/1, and $$\text{the ratio } X_{3A} = \frac{\text{Moles of Aromatic Acid}}{\text{Moles of Total Acid}}$$

extending between 0 and about 0.8/1.

7. An adhesive system of claim 6 wherein the copolyester A is a copolyester of phthalic and azelaic acids.

8. An adhesive system of claim 6 wherein the copolyester A is a copolyester of phthalic and azelaic acid with ethylene glycol and trimethylol propane.

9. An adhesive system of claim 6 wherein the copolyester A contains neopentyl glycol.

10. An adhesive system of claim 6 wherein the copolyester A contains adipic acid.

11. An adhesive system of claim 3 wherein the polyester-urethane B is formed from a hydroxyl-bearing polyester made from at least one polyol and at least one diacid wherein $$\text{the ratio } X_{1B} = \frac{\text{Total Moles of Polyol}}{\text{Total Moles of Diacid}}$$

is within the range 1.05/1-1.5/1 and the molecular weight $\overline{M}_n = 500-4,000$, $$\text{the ratio } X_{2B} = \frac{\text{Total Moles of Diol}}{\text{Total Moles of Polyol}}$$

is within the range $5/1-\infty$, $$\text{the ratio } X_{3B} = \frac{\text{Moles of Aromatic Acid}}{\text{Total Moles of Acid}}$$

is within the range 0-0.8/1, and $$\text{the ratio } X_{4B} = \frac{\text{Equivalents of —NCO}}{\text{Equivalents of —OH}}$$

is within the range 2/1-1.3/1.

12. An adhesive system of claim 11 wherein the hydroxyl-bearing polyester is a polyester of ethylene glycol, at least one phthalic acid and azelaic acid.

13. An adhesive system of claim 11 wherein the hydroxyl-bearing polyester is a polyester of ethylene glycol, trimethylol propane, ethylene glycol, at least one phthalic acid and azelaic acid.

14. An adhesive system of claim 3 wherein the polyisocyanate crosslinking agent is an adduct of toluene diisocyanate and trimethylol propane.

15. A substantially linear isocyanate-capped polyolurethane which is capable of forming a block copolymer with a hydroxyl-terminated polyo, said isocyanate-capped polyol-urethane formed from a polyol having a molecular weight $\overline{M}_n$ of about 500-4,000 which has been extended and capped with a diisocyanate in the —NCO/—OH ratio of 2/1-1.3/1, said isocyanate-capped polyurethane formed from a hydroxyl-bearing polyester made from at least one polyol and at least one diacid wherein $$\text{the ratio } X_{1B} = \frac{\text{Total Moles of Polyol}}{\text{Total Moles of Diacid}}$$

is within the range 1.05/1-1.5/1 and the molecular weight $\overline{M}_n = 500-4,000$, $$\text{the ratio } X_{2B} = \frac{\text{Total Moles of Diol}}{\text{Total Moles of Polyol}}$$

is within the range $5/1-\infty$, $$\text{the ratio } X_{3B} = \frac{\text{Moles of Aromatic Acid}}{\text{Total Moles of Acid}}$$

is within the range 0–0.8/1, and $$\text{the ratio } X_{4B} = \frac{\text{Equivalents of —NCO}}{\text{Equivalents of —OH}}$$

is within the range 2/1–1.3/1.

16. A solution in an organic solvent of at least 50% by weight of a polyol-urethane of claim 15.

17. As a curing agent for polymeric polyols, a blend of a substantially linear isocyanate-capped polyol-urethan B of claim 15 and
a polyisocyanate C of —NCO functionality greater than 2 in a dry nonreactive organic solvent,
B constituting between 94 and 50% by weight of the blend and C between 6 and 50% by weight, based on dry weight solids.

18. A curing agent of claim 17 wherein B constitutes between 90 and 70% by weight and C the remainder.

19. A curing agent of claim 17 wherein the solvent is a ketone or ester or a mixture thereof.

20. A high-solids adhesive formed in situ wherein a polymeric polyol A having a molecular weight $\overline{M}_n$ of about 1,000–5,000 and soluble in methyl ethyl ketone or ethyl acetate to the extent of at least 65% by weight is chain-extended and thereby increased in molecular weight by reaction with an isocyanate-capped polyester-urethane B making a block copolymer therewith,
said polyester-urethane B being formed from a hydroxyl-bearing polyester made from at least one polyol and at least one diacid wherein $$\text{the ratio } X_{1B} = \frac{\text{Total Moles of Polyol}}{\text{Total Moles of Diacid}}$$

is within the range 1.05/1–1.5/1 and the molecular weight $\overline{M}_n = 500–4,000$, $$\text{the ratio } X_{2B} = \frac{\text{Total Moles of Diol}}{\text{Total Moles of Polyol}}$$

is within the range 5/1–∞, $$\text{the ratio } X_{3B} = \frac{\text{Moles of Aromatic Acid}}{\text{Total Moles of Acid}}$$

is within the range 0–0.08/1, and $$\text{the ratio } X_{4B} = \frac{\text{Equivalents of —NCO}}{\text{Equivalents of —OH}}$$

is within the range 2/1–1.3/1.

21. An adhesive of claim 20 wherein A is a polyester.

22. An adhesive formed from:
A. a hydroxyl-terminated polymeric polyol having a molecular weight $\overline{M}_n$ of about 1,000–5,000 and soluble in methyl ethyl ketone or ethyl acetate to the extent of at least 65% by weight;
B. an isocyanate-capped polyol-urethane having a molecular weight $\overline{M}_n$ of about 500–4,000 and capable of forming a block copolymer with and thereby extending polyol A; and
C. a polyisocyanate crosslinking agent,
the equivalent ratio of —OH/—NCO being about 1/1 and B supplying at least 50–94% by weight of B plus C.

23. An adhesive of claim 22 wherein A forms 25–75% by weight of the solids present therein.

24. An adhesive of claim 22 wherein the polyol of A and the polyol of B are polyesters.

25. An adhesive of claim 24 wherein the hydroxyl-terminated polyester A is a copolymer of at least one aromatic dicarboxylic acid and at least one aliphatic dicarboxylic acid with at least one polyol, $$\text{the ratio } X_{1A} = \frac{\text{Total Moles of Polyol}}{\text{Total Moles of Diacid}}$$

extending between 1.05/1 and 1.5/1, $$\text{the ratio } X_{2A} = \frac{\text{Total Moles of Diol}}{\text{Total Moles of Higher Polyol}}$$

extending between ∞ and 0.86/1, and $$\text{the ratio } X_{3A} = \frac{\text{Moles of Aromatic Acid}}{\text{Moles of Total Acid}}$$

extending between 0 and about 0.8/1.

26. An adhesive of claim 25 wherein the polyester A is a polyester of phthalic and azelaic acids.

27. An adhesive of claim 25 wherein the polyester A is a polyester of phthalic and azelaic acids with ethylene glycol and trimethylol propane.

28. An adhesive of claim 25 wherein the polyester A contains neopentyl glycol.

29. An adhesive of claim 25 wherein the polyester A contains adipic acid.

30. An adhesive of claim 25 wherein the polyisocyanate crosslinking agent C is an adduct of toluene diisocyanate and trimethylol propane.

31. An adhesive of claim 30 wherein the polyester-urethane B is formed from a hydroxyl-bearing polyester made from at least one polyol and at least one diacid wherein $$\text{the ratio } X_{1B} = \frac{\text{Total Moles of Polyol}}{\text{Total Moles of Diacid}}$$

is within the range 1.05/1–1.5/1 and the molecular weight $\overline{M}_n = 500–4,000$, $$\text{the ratio } X_{2B} = \frac{\text{Total Moles of Diol}}{\text{Total Moles of Polyol}}$$

is within the range 5/1–∞, $$\text{the ratio } X_{3B} = \frac{\text{Moles of Aromatic Acid}}{\text{Total Moles of Acid}}$$

is within the range 0–0.8/1, and $$\text{the ratio } X_{4B} = \frac{\text{Equivalents of —NCO}}{\text{Equivalents of —OH}}$$

is within the range 2/1–1.3/1.

32. An adhesive of claim 31 wherein the poluyester-urethane B is formed from the polyester ethylene glycol//terephthalic acid/isophthalic acid/azelaic acid in the mole ratio of about 1.3//0.33/0.17/0.5 end-capped with toluene diisocyanate.

33. An adhesive of claim 32 wherein:
A is a polyester of trimethylol propane/ethylene glycol//terephthalic acid/isophthalic acid/azelaic acid of the mole ratio of about 0.2/1.0//0.15/0.25/0.60, the dry weight ratio A/B/C being about 57.24/33.67/9.09 and the dry weight ratio B/C being about 78.74/21.26.

34. An adhesive of claim 32 wherein:
A is a polyester of trimethylol propane/ethylene glycol//terephthalic acid/isophthalic acid of the mole ratio of about 0.3/1.0//0.2/0.3/0.5,
the dry weight ratio A/B/C being about 57.24/33.67/9.09 and the dry weight ratio B/C being about 78.74/21.26.

35. An adhesive of claim 32 wherein:
A is a polyester of trimethylol propane/ethylene glycol//terephthalic acid/isophthalic acid of the mole ratio of about 0.3/1.0//0.2/0.3/0.5,
the dry weight ratio A/B/C being about 48.29/42.61/9.1 and the dry weight ratio B/C being about 82.4/17.60.

36. An adhesive of claim 32 wherein:
A is a polyester of trimethylol propane/ethylene glycol//terephthalic acid/isophthalic acid/azelaic acid of the mole ratio of about 0.1/1.2//0.15/0.25/0.60,
the dry weight ratio A/B/C being about 48.29/42.61/9.10 and the dry weight ratio B/C being about 82.4/17.60.

37. An adhesive of claim 32 wherein:
A is a polyester of trimethylol propane/ethylene glycol//terephthalic acid/isophthalic acid/acelaic acid of the mole ratio of about 0.2/1.1//0.15/0.25/0.60,
the dry weight ratio A/B/C being about 48.29/42.61/9.10 and the dry weight ratio B/C being about 82.40/17.60.

38. An adhesive of claim 31 wherein the polyester-urethane B is formed from the polyester trimethylol propane/ethylene glycol//terephthalic acid/isophthalic acid/azelaic acid in the mole ratio of about 0.1/1.2//0.15/0.25/0.6 end-capped with toluene diisocyanate.

39. An adhesive of claim 38 wherein:
A is a polyester of trimethylol propane/ethylene glycol//terephthalic acid/isophthalic acid/azelaic acid of the mole ratio of about 0.2/1.0//0.15/0.25/0.60,
the dry weight ratio A/B/C being about 57.24/33.67/9.09 and the dry weight ratio B/C being about 78.74/21.26.

* * * * *

UNITED STATES PATENT OFFICE
CERTIFICATE OF CORRECTION

PATENT NO. : 4,419,476

DATED : December 6, 1983

INVENTOR(S) : James Edward Coughlin, Eugene Gary Sommerfeld and Clifford Hugh Strolle It is certified that error appears in the above-identified patent and that said Letters Patent are hereby corrected as shown below:

Column 2, lines 17 and 38, each occurrence, "noninterferring" should read --noninterfering--.
Column 2, line 57, "application" should read --patent--.
Column 10, line 18, "the" should read --The--.
Column 10, line 26, "14" should read --15--.
Column 12, line 46, Claim 17, "polyo" should read --polyol--.
Column 13, line 47, Claim 22, "0-0.08/1" should read --0-0.8/1--.
Column 14, line 59, Claim 34, "poluyester" should read --polyester--.

Signed and Sealed this

Twenty-fourth Day of April 1984

[SEAL]

Attest:

GERALD J. MOSSINGHOFF

Attesting Officer

Commissioner of Patents and Trademarks